No. 725,973. PATENTED APR. 21, 1903.
A. KUHLMANN.
GAGE.
APPLICATION FILED JAN. 2, 1902.
NO MODEL.
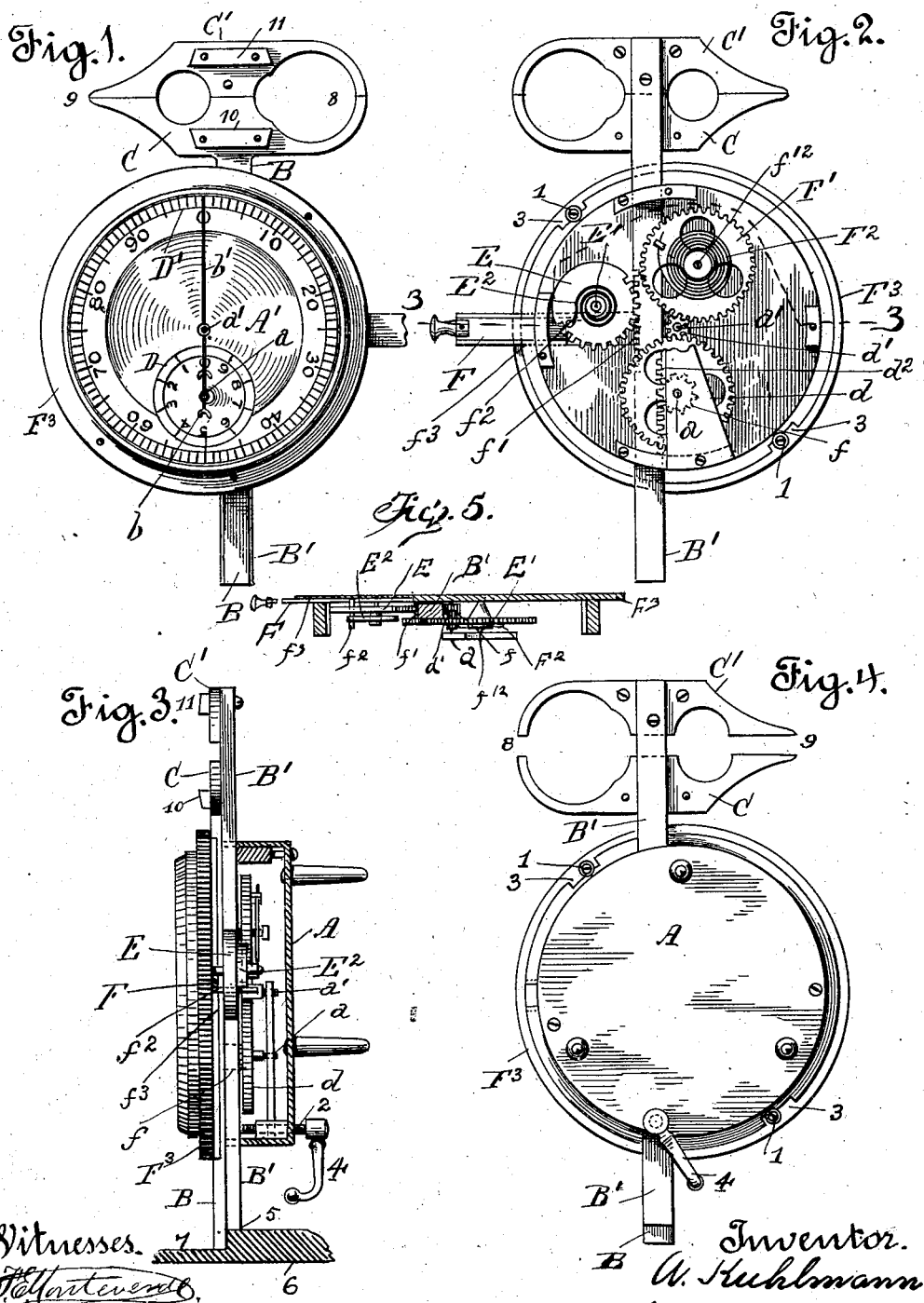

UNITED STATES PATENT OFFICE.

ALBERT KUHLMANN, OF SAN FRANCISCO, CALIFORNIA.

GAGE.

SPECIFICATION forming part of Letters Patent No. 725,973, dated April 21, 1903.

Application filed January 2, 1902. Serial No. 88,083. (No model.)

*To all whom it may concern:*

Be it known that I, ALBERT KUHLMANN, a citizen of Germany, residing in the city and county of San Francisco, State of California, have invented certain new and useful Improvements in Gages or Measuring Instruments; and I do hereby declare the following to be a full, clear, and exact description of the same.

The object of the present invention is the production of a simple and an efficient device for the gaging of distances between surfaces or for the measuring of the depth of grooves, holes, or for measuring the diameter or thickness of an article, the device being more especially adapted for use of watchmakers, jewelers, or the manufacturers of fine instruments or for the measurement of fine articles or small distances.

The invention resides more particularly in the means for actuating the gaging mechanism and the registering-pointers and in means whereby the gaging and registering mechanism may be held locked at any given reading.

To comprehend the invention, reference should be had to the accompanying sheet of drawings, wherein—

Figure 1 is a plan view of the gage or micrometer. Fig. 2 is a bottom plan view with the case removed. Fig. 3 is a part-sectional side view illustrating the gage or micrometer applied to the measurement of the depth of a shoulder. Fig. 4 is a bottom plan view of the gage with its casing attached. Fig. 5 is a cross-sectional top plan view taken on line $x\ x$ of Fig. 2 of the drawings.

It may be stated that the reading of the gage is in millimeters—that is, the registering means disclose millimeters and fractions thereof.

In the drawings the letter A is used to indicate the case or body portion, to which is attached the dial A'. Through the casing extend the bars B B', the bar B being a fixed one. Upon this bar slides the gaging-bar B', which bar as moved inward and outward actuates the registering means. To the upper end of the fixed bar is secured the jaw C, and to the upper end of the slide or gaging bar B' is secured a coöperating jaw C'. These jaws constitute a caliper-gage for the measurement of the thickness or the diameter of an article. Each bar extends a short distance below the casing or body A, the fixed bar B acting as a leg or rest for the measurement of the depth of a groove, shoulder, or hole, as will be hereinafter explained.

The dial A' is formed with an inner scale D and an outer circular scale D'. The inner scale is divided into millimeters, which in the present case range from one to ten, while the outer scale is divided into fractions of a millimeter, in the present case the division being into hundreds. Through the dial extends the arbors $a\ a'$. To outer end of arbor $a$ is fastened a pointer $b$, and to the outer end of arbor $a'$ the longer pointer $b'$, said pointers registering, respectively, with the millimeters and fractions of millimeters. To the arbor $a$, back of dial A', is secured a gear $d$, which gear meshes with pinion $d'$, secured to arbor $a'$, the relation between the gear and pinion being such that with revolution of the pinion the gear will make one-tenth of a revolution, or, in other words, the ratio is ten to one. The arbor $a$ is actuated by the movement of the slide or gaging bar B', which bar is formed on its inner edge with a series of rack-teeth $d^2$. These teeth mesh with pinion $f$, secured to the said arbor $a$. Hence a movement in either direction of the slide or gage bar imparts rotation to the arbor $a$, the motion of which is transmitted to arbor $a'$ through the medium of the gear and pinion $d\ d'$. The outer edge of the slide or gaging bar is also formed with rack-teeth $f'$, with which engage the teeth of the mutilated gear E. This gear is mounted upon a spindle E', to which is attached one end of a coiled spring $E^2$. The opposite end of said spring is attached to the said mutilated gear E. Said gear is connected to the slide-lever F by means of pin $f^2$, which pin extends through the gear E. (See Fig. 5 of the drawings.) The slide-lever extends through an opening in the casing A and works within a guide-groove $f^3$, formed in the under face of the dial. As the slide-lever is moved inward it bears against the pin $f^2$, causing the gear E to rotate, which gear engages with the rack-teeth of the gaging-bar B' and forces same upward. The moment the pressure is removed from slide-lever F the tension of coiled spring $E^2$ imparts an opposite movement to gear E and returns the slide or gaging bar to its normal position.

To compensate for the lost motion which exists between intermeshing gears and to prevent undue vibration of the registering-pointers, there is introduced an idle gear F'. This gear meshes with pinion $d'$ and exerts a constant pressure thereon, which pressure is due to the action of coiled spring $F^2$. One end of said spring is attached to the spindle $f^{12}$, upon which the idle gear is mounted, the opposite end being attached to the said gear F'.

The dial is secured within its rim $F^3$ by means of the set-screws 1, the head of which bears upon the edge of the dial. In order that slight adjustment may be permitted the dial to compensate for displacement of the pointers due to contraction and expansion, a portion of the dial edge is cut away at points 3, as indicated in Figs. 2 and 4 of the drawings. In case it is desired to shift the position of the dial it is only required to loosen the screws 1. The dial may then be shifted to the right or left as desired. When properly adjusted, the set-screws are tightened, so as to hold the dial in its adjusted position.

Through the casing there extends a lock-screw 2, Fig. 3, which when screwed in its full distance bears against the slide or gage bar B' and holds the same locked against movement. This lock-screw is operated by means of the lever or finger-piece 4, projecting laterally therefrom. By means of this lock device the slide or gage bar and the registering means controlled thereby may be held at any adjusted position, thus enabling the operator to remove the gage or micrometer from the article measured in order to obtain an accurate reading of the recorded measurement. This is an important feature, as it eliminates possibility of error in the correct reading of the measurement.

In the operation of the "depth-gage" or measuring the depth of a groove, channel, shoulder, socket, hole, &c., the slide or gaging bar B' is placed against the edge 5 of the article 6, Fig. 3 of the drawings, to be measured and the body or casing A pressed downward until the fixed bar or leg B rests against the inner surface 7 of the article. As the slide or gaging bar is moved upward through the casing the pointers through the medium of the before-described mechanism rotate until the proper depth is indicated on the dial-scales. With each complete revolution of the pointer $b'$ the pointer $b$ will be moved one-tenth of its scale, or to a position indicating one millimeter.

The measuring of diameters is accomplished by the curved ends 8 of the caliper-jaws, while thickness of an article is preferably measured by the flats 9 of said jaws. When using the caliper-jaws for measuring, the slide or gaging bar B' is operated to actuate the jaw C' or move same away from its coöperating jaw by means of the hand-pressed lever F. As this lever is forced inward the slide or gaging bar is gradually moved upward, as hereinbefore explained, causing the caliper-jaws to separate or move apart until the proper distance is obtained. When thus spaced, the measurement as to the thickness or diameter of the article will be indicated by the pointers upon the dial-scales. On the lower or fixed member C of the caliper-jaws a shoulder 10 is formed, and on the movable member C' a similar shoulder 11. The distance between these shoulders when the caliper-jaws stand closed is ten millimeters, which distance when the jaws stand fully opened is increased to twenty millimeters—that is, the original distance between the shoulders plus the ten-millimeter lift of the slide or gaging bar. By this means articles may be measured up to twenty millimeters, it only being required where the measurement exceeds ten millimeters to add to the dial reading ten millimeters, or the normal distance between the shoulders 10 and 11.

Having thus described the invention, what is claimed as new, and desired to be protected by Letters Patent, is—

1. The combination with the pointers for indicating unit and fraction-of-unit measurement, of coöperating means for actuating said pointers whereby the pointer designating units is advanced one unit with each revolution of the pointer designating fractions, a vertically-movable slide or gaging bar which engages with and actuates the operating means during its movement, a longitudinally-slidable hand-actuated lever and means acted upon by the said lever for imparting vertical movement to the slide or gaging bar.

2. The combination with the fixed bar, of the vertically-movable slide or gaging bar, a caliper-jaw attached to the fixed bar, a coöperating jaw secured to and carried by the slide or gaging bar, intermeshing gears actuated by the slide or gaging bar for registering the movement thereof, longitudinally-movable hand-actuated lever, connection between said lever and the gaging-bar whereby vertical movement is imparted to said bar upon the inward movement of the hand-lever, and means attached to the body portion of the gage for engaging the said slide or gaging bar and holding the same locked at any desired position.

3. The combination with the fixed bar, of the vertically-movable slide or gaging bar, a caliper-jaw attached to the fixed bar, a coöperating jaw secured to and carried by the slide or gaging bar, a longitudinally-movable lever, connection between said lever and the vertically-movable slide or gaging bar, means whereby the said bar may be locked at any desired position, and mechanism for indicating the movement of the slide or gaging bar.

4. The combination with the body portion having a dial attached thereto, scales for unit and fraction-of-unit measurement arranged on said dial, pointers for the scales, a vertically-movable slide or gaging bar, intermeshing means actuated by the movement of said bar to operate the scale-pointers, a longitudinally-movable hand-operated lever, and connection between the hand-lever and the gage-bar, whereby the said gage-bar is moved outwardly during the inward movement of the said lever.

5. The combination with the case or body portion, of a dial thereon, means whereby the dial is adjustably secured to the case or body portion, scales arranged on said dial for the measurement of units and fractions thereof, pointers for the scales, a slide or gaging rod, means actuated by the movement of said rod, said means operating the pointers to register the movement of the slide or gaging rod, and means for locking the said rod at any desired position.

In witness whereof I have hereunto set my hand.

ALBERT KUHLMANN.

Witnesses:
N. A. ACKER,
WALTER F. VANE.